H. SHOEMAKER.
RECEIVING APPARATUS.
APPLICATION FILED JAN. 20, 1906.
902,613.
Patented Nov. 3, 1908.
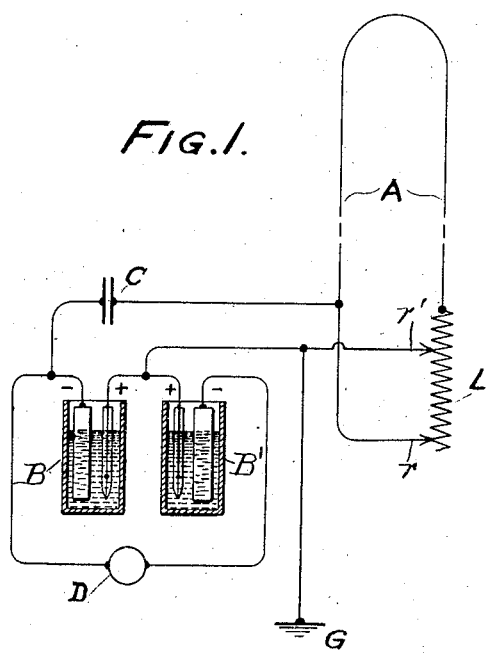
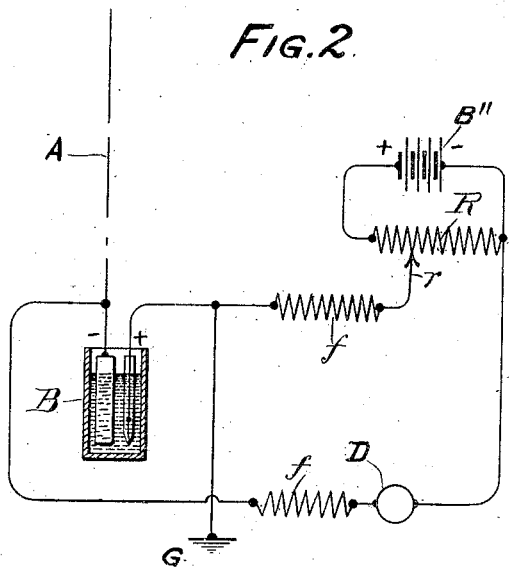
WITNESSES:
INVENTOR
Harry Shoemaker
BY
Cornelius D. Ehret
HIS ATTORNEY.

UNITED STATES PATENT OFFICE.

HARRY SHOEMAKER, OF JERSEY CITY, NEW JERSEY, ASSIGNOR TO INTERNATIONAL TELEGRAPH CONSTRUCTION COMPANY, A CORPORATION OF NEW YORK.

RECEIVING APPARATUS.

No. 902,612.

Specification of Letters Patent.

Patented Nov. 3, 1908.

Application filed January 20, 1906. Serial No. 296,986.

*To all whom it may concern:*

Be it known that I, HARRY SHOEMAKER, a citizen of the United States, residing at Jersey City, in the county of Hudson and State of New Jersey, have invented a new and useful Receiving Apparatus, of which the following is a specification.

My invention relates to signaling systems more especially to those in which the message is represented during transmission through the natural media by Hertzian waves or electro-radiant energy.

More particularly my invention resides in the receiving apparatus for use in such systems, and comprises means whereby a recording apparatus may be operated or actuated, as the resultant of the interaction of a source of current or electro-motive force and a wave-responsive device which is also a source of current or of electro-motive force.

For an illustration of several of the forms that my invention may take reference is to be had to the accompanying drawings, in which:—

Figure 1 is a diagrammatic view showing two small primary cells coöperating with each other to operate or control a recording instrument or other signal translating instrument. Fig. 2 is a diagrammatic view of a small primary cell associated with a local source of electro-motive force or current which coöperates with the primary cell to control or actuate the recording apparatus, or other signal translating instrument.

Referring to Fig. 1, A represents a looped aerial conductor associated with an inductance L upon which are adjustable the two riders $r$ and $r'$. The rider $r$ is connected to the foot of one leg of the looped aerial conductor, while the rider $r'$ connects with the earth at G and with the two positive elements of the two small primary cells B and B'. Each of these primary cells comprises a cell excitant of any suitable composition, such as dilute sulfuric acid, caustic potash, etc. or may be arranged in dry cell form. The elements by which the current leaves the cells, and here termed the positive elements, consist preferably of small platinum wires sealed in glass tubes and ground off flush so that their end sections only contact the cell excitant. These wires are preferably relatively small in diameter, as for example one mil, two mils, three mils, or even more, or even less than one mil. The other elements of each cell are preferably of zinc. It is to be understood however that the cell elements are not limited to platinum and zinc, but that any suitable materials may be used so long as they are dissimilar and therefore capable of producing an electro-motive force. In a circuit including the cells B and B' in series is included a recording device, D, such as the siphon recorder or relay; or if desired it may be a telephone receiver. The condenser C is connected between the foot of one leg of the aerial A and the negative element of the cell B.

In operation, the cell B may be considered as a primary cell wave-responsive device subjected to the electrical potential or current conducted to it through the riders $r$ and $r'$. In the circuit including the cells B and B' and the recorder D all in series with each other, the two cells B and B' normally balance each other, or practically balance each other, and accordingly when the cell B is subjected to the effects of the received energy this balance is disturbed with resultant flow of current through the recording device or other instrument D. This arrangement is practically adaptable for operation of a recorder or relay since relatively great effects may be so obtained. The condenser C may serve to prevent the flow of direct current from either of the cells B or B'. While this arrangement has been shown in connection with a looped aerial conductor, and in connection with an inductance, it is to be understood that it may be employed in connection with any other type of aerial conductor or arrangement of receiving circuits.

In Fig. 2 a simple aerial conductor A is represented between which and the earth G is connected a small primary cell detector B similar to that described in connection with Fig. 1. In place of the second cell B' however a battery B'' with potentiometer resistance R and rider $r$ is employed to balance the effect of the cell B. As shown, the battery B'' and the cell are balanced and oppose each other so that normally no current flows through the device, relay, or other signal translating instrument D. Choke coils $f$, $f$, prevent the passage of the high frequency oscillation to the potentiometer circuit.

What I claim is:

1. In a wireless signaling system, a plurality of sources of electro-motive force or current balanced against each other, and adapted to be unbalanced by received electro-radiant energy, and a recording instrument or signal translating signal instrument responsive to the unbalancing.

2. Means for detecting electrical waves comprising a plurality of primary cell detectors connected in opposition to each other.

3. A wave-responsive device comprising a pair of practically similar sources of current of substantially equal energies connected in opposition to each other.

4. A wave-responsive device comprising a pair of primary cells of minute power connected in opposition to each other.

5. In combination, a receiving circuit or conductor, a plurality of sources of current of minute power associated therewith, and a circuit including a signal translating instrument and said sources of current connected in opposition to each other.

6. In combination, a receiving circuit or conductor, a source of current of minute power associated therewith as a wave-responsive device, a second source of current connected in opposition to said wave-responsive device, and a signal translating instrument.

7. In combination, a receiving circuit or conductor, a primary cell of minute power associated therewith as a wave-responsive device, and a circuit including said wave-responsive device a signal translating instrument and a source of current connected in opposition to said wave-responsive device.

8. In combination, a receiving circuit or conductor, a plurality of sources of current of minute power associated therewith, and a circuit including a signal translating instrument and said sources all serially connected, said sources being connected in opposition to each other with respect to said circuit.

9. In combination, a receiving circuit or conductor, a source of current of minute power associated therewith as a wave-responsive device, a second source of current connected in opposition to said wave-responsive device and balanced against the same, and a signal translating instrument responsive to unbalancing.

10. In combination, a looped aerial conductor, opposed sources of energy as means for detecting electrical waves associated therewith, and a signal translating instrument included in circuit with said wave-responsive devices.

11. In combination, a receiving conductor, a source of energy associated therewith as a wave-responsive device, a local source of current, and means for graduating said local source of current to balance said wave-responsive device, and a signal translating instrument.

12. In combination, a looped aerial conductor, means for adjusting the effective length thereof, opposed sources of energy of minute power as means for detecting electrical waves associated with the variable portion of said loop, and a signal translating instrument.

HARRY SHOEMAKER.

Witnesses:
AGNES REID,
ALICE S. MARSH.